(12) United States Patent
Liu (10) Patent No.: US 11,315,511 B2
(45) Date of Patent: Apr. 26, 2022

(54) DISPLAY PANEL AND COMMON ELECTRODE OF THE SAME

(71) Applicant: Wuhan China Star Optoelectronics Technology Co., Ltd., Hubei (CN)

(72) Inventor: Yuanfu Liu, Guangdong (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 666 days.

(21) Appl. No.: 16/061,556

(22) PCT Filed: Mar. 8, 2018

(86) PCT No.: PCT/CN2018/078476
§ 371 (c)(1),
(2) Date: Jun. 12, 2018

(87) PCT Pub. No.: WO2019/153400
PCT Pub. Date: Aug. 15, 2019

(65) Prior Publication Data
US 2021/0082364 A1    Mar. 18, 2021

(30) Foreign Application Priority Data
Feb. 8, 2018    (CN) .......................... 201810128629.2

(51) Int. Cl.
*G09G 3/36*    (2006.01)
*G02F 1/1333*    (2006.01)
(Continued)

(52) U.S. Cl.
CPC ....... *G09G 3/3655* (2013.01); *G02F 1/13338* (2013.01); *G02F 1/134309* (2013.01);
(Continued)

(58) Field of Classification Search
CPC ............... G09G 3/3655; G09G 3/3696; G09G 2320/0257; G02F 1/13338; G02F 1/134309; G02F 1/136286
See application file for complete search history.

(56) References Cited

U.S. PATENT DOCUMENTS 9,563,086 B2    2/2017 Lee et al.
2009/0135125 A1  5/2009 Park
(Continued)

FOREIGN PATENT DOCUMENTS

CN    1985209 A    6/2007
CN    101718931 A   6/2010
(Continued)

OTHER PUBLICATIONS

Chinese Office Action issued in corresponding Chinese Patent Application No. 2018101286292, dated Feb. 3, 2020, China National Intellectual Property Administration, Beijing, China.
(Continued)

*Primary Examiner* — Chanh D Nguyen
*Assistant Examiner* — Ngan T. Pham-Lu
(74) *Attorney, Agent, or Firm* — PV IP PC; Wei Te Chung; Ude Lu (57) ABSTRACT

A common electrode of a display panel is disclosed. The common electrode is located at a side of a gate driving device of the display panel, and the common electrode includes multiple main trunk electrodes arranged sequentially along a row direction, along the row direction, from a side closed to the gate driving device to a side away from the gate driving electrode, in adjacent two main trunk electrodes, a common voltage on a previous main trunk electrode is less than or equal to a common voltage on a next main trunk electrode, and a common voltage of a first main trunk electrode is less than a common voltage on a last main
(Continued)

trunk electrode. The present invention can reduce the uneven display caused by RC delay on the transmission of the scanning signal.

8 Claims, 4 Drawing Sheets

(51) Int. Cl.
    *G02F 1/1343*     (2006.01)
    *G02F 1/1362*     (2006.01)
(52) U.S. Cl.
    CPC ..... *G02F 1/136286* (2013.01); *G09G 3/3696* (2013.01); *G02F 1/134318* (2021.01); *G09G 2320/0257* (2013.01)

(56) References Cited

U.S. PATENT DOCUMENTS

| | | | | |
|---|---|---|---|---|
| 2016/0282689 A1* | 9/2016 | Zhang | ............... | G02F 1/13306 |
| 2016/0328075 A1* | 11/2016 | Luo | .................. | G06F 3/04164 |
| 2016/0358525 A1* | 12/2016 | Huang | ................. | G06F 3/0412 |
| 2017/0003775 A1* | 1/2017 | Hu | ..................... | G06F 3/04166 |
| 2018/0095573 A1* | 4/2018 | Kwon | .................. | G02F 1/1343 |
| 2019/0088224 A1* | 3/2019 | Fujimoto | ........... | G09G 3/3655 |

FOREIGN PATENT DOCUMENTS

| | | |
|---|---|---|
| CN | 101847376 A | 9/2010 |
| CN | 101916019 A | 12/2010 |
| CN | 102608817 A | 7/2012 |
| CN | 103149765 A | 6/2013 |
| CN | 103676360 A | 3/2014 |
| CN | 103941502 A | 7/2014 |
| CN | 104698698 A | 6/2015 |
| CN | 104407728 B | 8/2017 |
| TW | 200304633 A | 10/2003 |

OTHER PUBLICATIONS

International search report dated Oct. 29, 2018 from corresponding application No. PCT/CN2018/078476.

* cited by examiner

DISPLAY PANEL AND COMMON ELECTRODE OF THE SAME

CROSS REFERENCE

This application is a national phase of PCT Patent Application No. PCT/CN2018/078476, entitled "display panel and common electrode of the same", filed on Mar. 8, 2018, which claims priority to China Patent Application No. 201810128629.2 filed on Feb. 8, 2018, both of which are hereby incorporated in its entireties by reference.

FIELD OF THE INVENTION

The present invention relates to a display technology field, and more particularly to display panel and common electrode of the same.

BACKGROUND OF THE INVENTION

In a conventional liquid crystal display panel, generally including a gate driving device, multiple scanning lines, data driver, multiple data lines, multiple thin-film transistors, and a common electrode. Wherein, the multiple scanning lines are electrically connected to the gate driving device. The multiple scanning lines are extended along a row direction. The multiple data lines are electrically connected to the data driving device. The multiple data lines are extended along the column direction. The data lines and the scanning lines are intersected. The thin-film transistor is connected to corresponding scanning line, data line and pixel electrode. The pixel electrode and the common electrode form two electrodes of the pixel capacitor. The common electrode is an entire surface such that the common voltages on the common electrode are the same.

Generally, the gate driving device will send the scanning signal to the scanning line in order to control the turning-on or turning-off of the thin-film transistor. The scanning signal includes a turn-on voltage Vg_on and a turn-off voltage Vg_off. The turn-on voltage Vg_on is used for controlling the conduction of the thin-film transistor. The turn-off voltage Vg_off is used to control the cut-off of the thin-film transistor. However, in the process of the transmission of the scanning signal on the scanning line, because of the internal resistance and the capacitance, a RC delay of the scanning signal will generate. Farther away from the scanning signal, the RC delay is more serious such that the scanning signal on the scanning line away from the gate driving device will generate a serious delay.

Figure 1A:
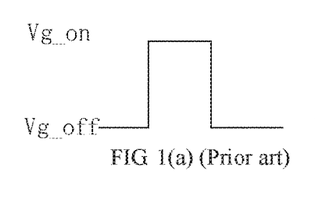
FIG. 1(a)-FIG. 1(c) are waveform diagrams of scanning signal at different locations of the conventional art.
Figure 1B:
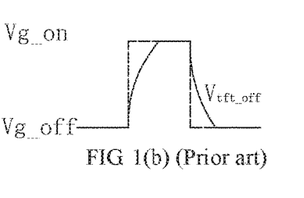
Figure 1C:
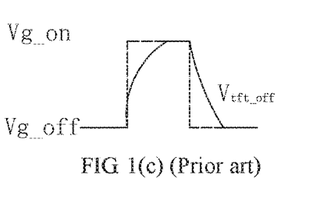

With reference to FIG. 1(a), FIG. 1(b) and FIG. 1(c), FIG. 1(a) is a transmission signal of the scanning signal on the scanning line close to the gate driving device, the scanning signal is sent the thin-film transistor connected the first pixel electrode. FIG. 1(c) is a transmission signal of the scanning signal on the scanning line away from the gate driving device, the scanning signal is sent the thin-film transistor connected the third pixel electrode, and FIG. 1(b) is a transmission signal of the scanning signal on the scanning line at the middle location, the scanning signal is sent the thin-film transistor connected the second pixel electrode. With reference to FIG. 1(a), FIG. 1(b) and FIG. 1(c), when the scanning signal is changed from turn-on voltage Vg_on to turn-off voltage Vg_off, on the scanning line closed to the gate driving device, because the RC delay is slight or not existed, the scanning signal can immediately change from turn-on voltage Vg_on to turn-off voltage Vg_off so that in FIG. 1(a), a vertical straight line is shown. At the middle location of the scanning line, the RC delay is a little serious, the scanning signal changes from turn-on voltage Vg_on to turn-off voltage Vg_off with a delay so that in FIG. 1(b), a curved line is shown. That is, after the thin-film transistor reach a cut-off voltage VTFT-off, the thin-film transistor can be turned off. On the scanning line away from the gate driving device, because the RC delay is most serious, the scanning signal changes from turn-on voltage Vg_on to turn-off voltage Vg_off with a delay so that in FIG. 1(c), a curved line is shown. That is, after the thin-film transistor reach a cut-off voltage VTFT-off, the thin-film transistor can be turned off.

Because of the RC delay, when the scanning signal changes from turn-on voltage to turn-off voltage, the pixel electrode will generate a feed through effect. The voltage drops caused by the feed through voltage at the first pixel electrode, the second pixel electrode and the third pixel electrode are different. Specifically, the voltage drop "a" of the feed through voltage at the first pixel electrode is proportional to (turn-on voltage Vg_on-turn-off voltage Vg_off), the voltage drop "b" of the feed through voltage at the second pixel electrode is proportional to (the turn-off voltage Vg_off slightly greater than the cut-off voltage VTFT-off). The cut-off voltage VTFT-off is smaller than the turn-off voltage Vg_off. The voltage drop "c" of the feed through voltage at the third pixel electrode is proportional to (the cut-off voltage VTFT-off—the turn-off voltage Vg_off).

Figure 1D:
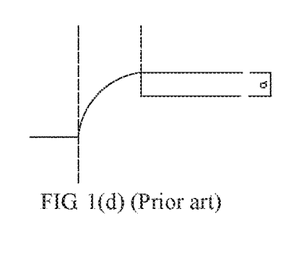
FIG. 1(d)-FIG. 1(f) are schematic diagrams of voltages of pixel electrodes at different locations of the conventional art.
Figure 1E:
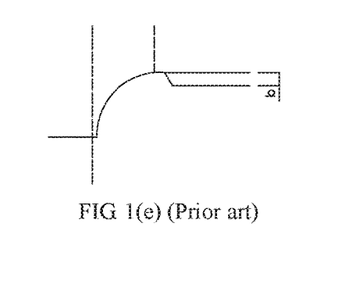
Figure 1F:
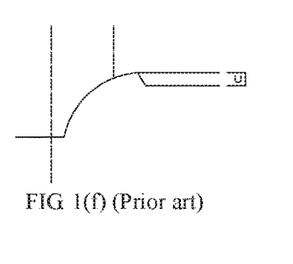

Accordingly, the voltage drop "a" of the feed through voltage at the first pixel electrode is greater than the voltage drop "b" of the feed through voltage at the second pixel electrode, the voltage drop "b" of the feed through voltage at the second pixel electrode is slightly greater than the voltage drop "c" of the feed through voltage at the third pixel electrode, approximately as b=c. With reference to FIG. 1(d), FIG. 1(d) and FIG. 1(f), because the common voltage on the common electrode is the same, the RC delay of the scanning lines at different locations is different. The voltage drops caused by the feed through voltage of the pixel electrode at different locations are also different. The voltage drops of the pixel capacitor at different locations are not consistent so as to cause uneven display, picture flicker or image residue.

SUMMARY OF THE INVENTION

The technology problem solved by the embodiment of the present invention is to provide a common electrode and a display panel to reduce the uneven display cause by RC delay on the transmission of the scanning signal.

In order to solve the above technology problem, a first aspect of the present invention provides a common electrode of a display panel, wherein the common electrode is located at a side of a gate driving device of the display panel, and the common electrode comprise: multiple main trunk electrodes arranged sequentially along a row direction, along the row direction, from a side closed to the gate driving device to a side away from the gate driving electrode, in adjacent two main trunk electrodes, a common voltage on a previous main trunk electrode is less than or equal to a common voltage on a next main trunk electrode, and a common voltage of a first main trunk electrode is less than a common voltage on a last main trunk electrode.

Wherein a portion of the multiple main trunk electrodes is strip-shaped, and extended along a column direction.

Wherein a portion of the multiple main trunk electrodes include multiple independent branch electrodes, and the multiple independent branch electrodes of a same main trunk electrode are sequentially arranged along the column direction.

A second aspect of the present invention provides a display panel, comprising: a gate driving device; multiple scanning lines, wherein a side of the multiple scanning lines are electrically connected to the gate driving device, and the multiple scanning lines are extended along the row direction and are in parallel to each other; multiple pixel electrodes electrically connected to corresponding scanning lines through thin-film transistor; a common electrode, wherein the common electrode and the pixel electrode form two electrodes of a pixel capacitor, the common electrode includes multiple main trunk electrodes arranged sequentially along a row direction; a common voltage providing unit electrically connected to the multiple main trunk electrodes for providing common voltages to corresponding main trunk electrodes; wherein from a side closed to the gate driving device to a side away from the gate driving electrode, in adjacent two main trunk electrodes, a common voltage on a previous main trunk electrode is less than or equal to a common voltage on a next main trunk electrode, and a common voltage of a first main trunk electrode is less than a common voltage on a last main trunk electrode.

Wherein a portion of the multiple main trunk electrodes is strip-shaped, and extended along a column direction.

Wherein a portion of the multiple main trunk electrodes include multiple independent branch electrodes, and the multiple independent branch electrodes of a same main trunk electrode are sequentially arranged along the column direction.

Wherein each of the multiple branch electrodes is connected to the common voltage providing unit through a lead wire.

Wherein each of the main trunk electrodes includes multiple independent branch electrodes.

Wherein the common voltage providing unit is a touch chip, and the touch chip sends a common voltage signal and a touch signal in a time division manner such that when the branch electrode receives the common voltage signal, the branch electrode is used for displaying, when the branch electrode receives the touch signal, the branch electrode is used for detecting if an user touch the display panel.

Wherein each branch electrode covers with at least one pixel electrode.

The present invention has following effects: in the present embodiment, because the common electrode includes multiple main trunk electrodes, in the row direction from a side closed to the gate driving device to a side away from the gate driving device, in adjacent two main trunk electrodes, the common voltage of the previous main trunk electrode is less than or equal to the common voltage of the next main trunk electrode, and the common voltage on the first main trunk electrode is less than the common voltage on the last main trunk electrode. Accordingly, at row direction and different locations, the common voltages of the main trunk electrode are different, through disposing different common voltages to compensate different voltage drops of feeding voltage at different pixel electrodes such that the entire voltage drops of the pixel capacitors at different locations tend to be consistent in order to reduce the uneven display caused by RC delay in the transmitting process without causing picture flicker or image residue.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, system, product, or device. It should be noted that, herein, relational terms such as first and second, and the like are only used to distinguish one entity or operation from another entity or operation. It is not required or implied that these entities or operations exist any such relationship or order between them. The terms are only used to distinguish one element from another element.

First Embodiment

Figure 2:
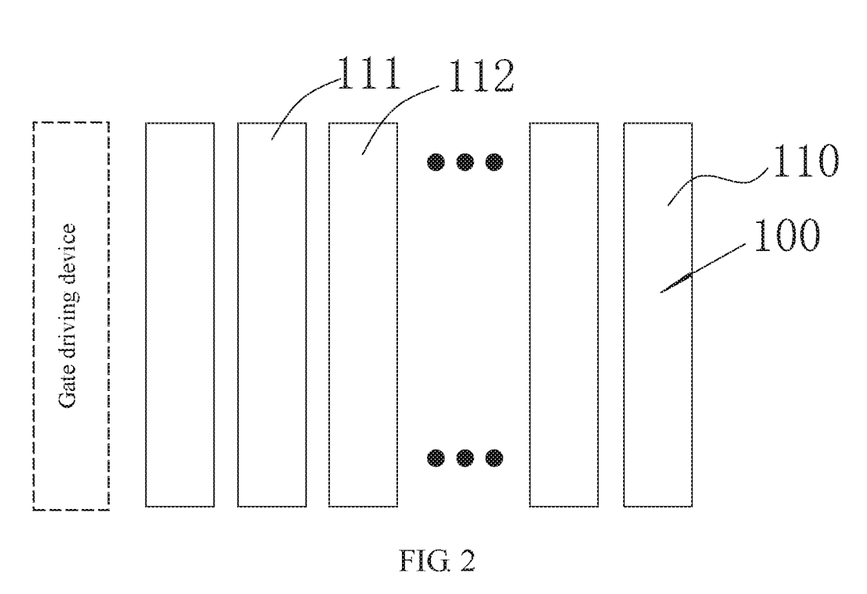
FIG. 2 is a schematic diagram of a common electrode of a first embodiment of the present invention.

The first embodiment of the present invention provides a common electrode 100 of a display panel. With reference to FIG. 2, the common electrode 100 is located at a side of a gate driving device 210. In the present embodiment, the common electrode 100 is located at a right side of the gate driving device 210. The common electrode 100 includes multiple main trunk electrodes 110. For example, the number of the main trunk is two, three, four, five, six or more; the multiple main trunk electrodes are arranged along a row direction. As shown in FIG. 2, arranging sequentially from a left to a right. A gap is existed between adjacent main trunk electrodes 110.

In the present embodiment, the main trunk electrodes are applied with a common voltage. Specifically, along the row direction, from a side closed to the gate driving device (the left side of FIG. 2) to a side away from the gate driving electrode (the right side of FIG. 2), in adjacent two main trunk electrodes 110, a common voltage on a previous main trunk electrode 110 is less than or equal to a common voltage on a next main trunk electrode 110. With reference to two adjacent main trunk electrodes 110 in FIG. 2, respectively, a first main trunk electrode 111 and a second main trunk electrode 112, wherein, the first main trunk electrode 111 is located in front of the second main trunk electrode 112. The first main trunk electrode 111 is closer to the gate driving device. A common voltage applied on the first main trunk electrode 111 is less than or equal to a common voltage applied on the second main trunk electrode 112. In the present embodiment, common voltages applied on the multiple main trunk electrodes 110 are gradually increased along a row direction from left to right. That is, a common voltage applied on a previous main trunk electrode 110 is less than or equal to a common voltage applied on a next main trunk electrode However, the present invention is not limited, in another embodiment of the present invention, the common voltages applied on the multiple main trunk electrodes 110 are gradually increased along the row direction from left to right, and adjacent two main trunk electrodes can be the same. In the present embodiment, in the row direction, the common voltage applied on the first main trunk electrode 110 is less than the common voltage applied on the last main trunk electrode 110. That is, the common voltage applied on the first main trunk electrode 110 in the left side of FIG. 2 is less than the common voltage applied on the last main trunk electrode 110 counted from the left side of FIG. 2. Besides, in another embodiment of the present invention, can be counted from a right side (at this time, the gate driving device is located at a right side). In the row direction, a common voltage applied on a first main trunk electrode 110 is less than or equal to a common voltage applied on a last main trunk electrode 110. That is, the common voltage applied on the first main trunk electrode 110 at left side of FIG. 2 is less than the common voltage applied on the last main trunk electrode 110 counted from the left side. Besides, in another embodiment of the present invention, can be counted from a right side (at this time, the gate driving device is located at a right side). In the row direction from the right side to the left side, in two adjacent main trunk electrodes, a common voltage applied on a previous main trunk electrode 110 is less than or equal to a common voltage applied on a last main trunk electrode 110. That is, the common voltage applied on the first main trunk electrode at right side of FIG. 2 is less than the common voltage applied on the last main trunk electrode counted from the right side.

In the present embodiment, because the common electrode 100 includes multiple main trunk electrodes 110, in the row direction from a side closed to the gate driving device to a side away from the gate driving device, in adjacent two main trunk electrodes 110, the common voltage of the previous main trunk electrode 110 is less than or equal to the common voltage of the next main trunk electrode 110, and the common voltage on the first main trunk electrode 110 is less than the common voltage on the last main trunk electrode 110. Accordingly, at row direction and different locations, the common voltages of the main trunk electrode 110 are different, through disposing different common voltages to compensate different voltage drops of feeding voltage at different pixel electrodes such that the entire voltage drops of the pixel capacitors at different locations tend to be consistent in order to reduce the uneven display caused by RC delay in the transmitting process without causing picture flicker or image residue.

In the present embodiment, all of the main trunk electrodes 110 is strip-shaped as a long bar. Each main trunk electrode 110 is extended along a column direction. In the present embodiment, the voltage drops of the multiple pixel electrodes 230 closed to the gate driving device 210 are closer so that the common voltages applied on the strip-shaped main trunk electrodes 110 can be the same so that the entire voltage drop of the pixel capacitors formed by a same main trunk electrode tends to consistent. Besides, because the main trunk electrode 110 is a long bar, the manufacturing process is simple and the cost is low. However, the present invention is not limited, in another embodiment of the present invention, a portion of the main trunk electrode is not a long bar. For example, a portion of the main trunk electrode can be multiple independent branch electrodes.

Second Embodiment

Figure 3:
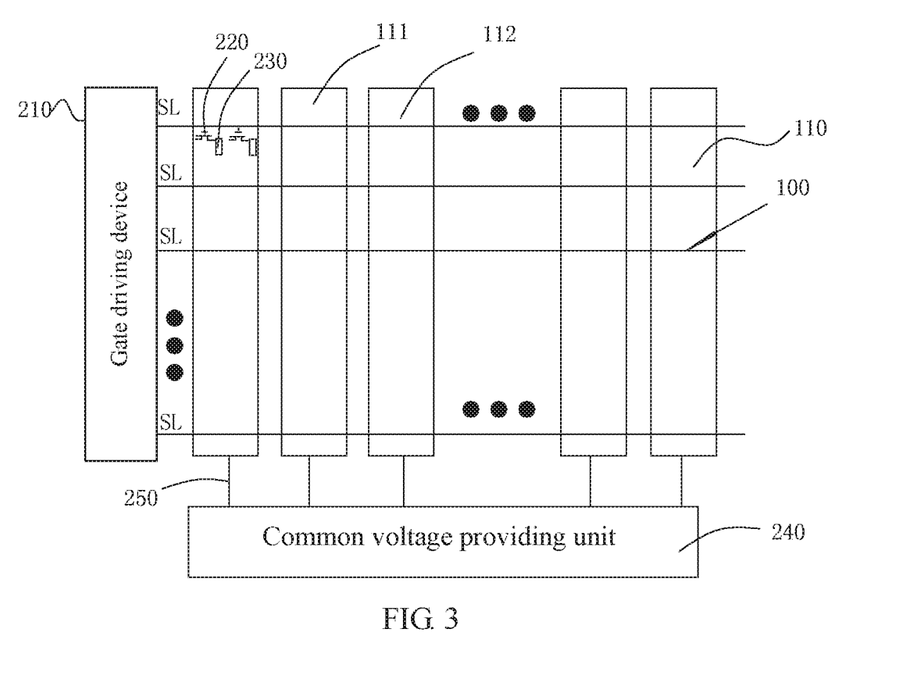
FIG. 3 is a schematic diagram of a display panel of a second embodiment of the present invention.

The second embodiment of the present invention provides with a display panel, and the display panel includes the common electrodes in the first embodiment. With reference to FIG. 3, the display panel includes a gate driving device 210, multiple scanning lines SL, multiple pixel electrodes 230, common electrode 100, and a common voltage providing unit 240.

In the present embodiment, the gate driving device 210 will transmit a scanning signal, and the scanning signal includes a turn-on voltage and a turn-off voltage. The turn-on voltage is used for controlling a conduction of a thin-film transistor 220, the turn-off voltage is used for controlling a cutoff of the thin-film transistor 220. In the present embodiment, the gate driving device 210 is located at a left side of the display panel. However, the present invention is not limited, in another embodiment of the present invention, the gate driving device can also be located at a right side of the display panel.

In the present embodiment, a left side of the multiple scanning lines SL is respectively electrically connected to the gate driving device 210 such that the scanning lines SL transmit the scanning signals outputted from the gate driving device 210. The multiple scanning lines SL are extended along the row direction and are in parallel to each other. Because of the RC delay, farther away from the gate driving device 210, the delay of the scanning signal is more serious.

In the present embodiment, multiple pixel electrodes 230 are electrically connected to corresponding scanning lines through the thin-film transistors 220. When the turn-on voltage is transmitted on the scanning line SL, the thin-film transistor 220 is turned on. At this time, the pixel electrode 230 is charged through the data line (not shown in the figure). When the turn-off voltage is transmitted on the scanning line SL, the thin-film transistor 220 is turned off. At this time, the voltage on the pixel electrode 230 is maintained. In the present embodiment, when the scanning signal outputted from the gate driving device 210 is transformed from the turn-on voltage to the turn-off voltage, the corresponding pixel electrode generates a feed through effect. Because of the RC delay of the scanning signal, the pixel electrodes 230 at the row direction and different locations will have different voltage drops because of the feed through voltage.

In the present embodiment, the common electrode 100 and the pixel electrode 230 form two electrodes of the pixel capacitor. The common electrode includes multiple main trunk electrodes 110. The multiple main trunk electrodes 110 are arranged sequentially along a row direction. The multiple main trunk electrodes 110 are independent. In the present embodiment, one main trunk electrode 110 and multiple pixel electrodes 230 form multiple pixel capacitors.

In the present embodiment, the common voltage providing unit 240 is respectively electrically connected to the multiple main trunk electrodes 110 for providing common voltages to corresponding main trunk electrodes 110. In the present embodiment, different main trunk electrodes 110 can obtain different common voltages through the common voltage providing unit 240.

In the present embodiment, in the row direction from a side closed to the gate driving device to a side away from the gate driving device, in adjacent two main trunk electrodes 110, the common voltage of the previous main trunk electrode 110 is less than or equal to the common voltage of the next main trunk electrode 110. Here, in the row direction from a left side to a right side, in adjacent two main trunk electrodes 110, the common voltage of the previous main trunk electrode 110 is less than or equal to the common voltage of the next main trunk electrode 110, and the common voltage of the first main trunk electrode 110 counted from the left side is less than the common voltage of the last main trunk electrode 110 counted from the left side.

In the present embodiment, because the voltage drops caused by the feeding voltages of different pixel electrodes 230 at the row direction is gradually decreased from a side closed to the gate driving device 210 to a side away from the gate driving device 210, and the common voltages on the main trunk electrodes 110 along the row direction are gradually increased from a side closed to the gate driving device 210 to a side away from the gate driving device 210. Through disposing different common voltages to compensate different voltage drops of feeding voltage at different pixel electrodes such that the entire voltage drops of the pixel capacitors at different locations tend to be consistent in order to reduce the uneven display caused by RC delay in the transmitting process without causing picture flicker or image residue.

In the present embodiment, all of the main trunk electrodes 110 is strip-shaped as a long bar. Each main trunk electrode 110 is extended along a column direction. The strip-shape main trunk electrodes 110 are perpendicular to the scanning lines SL. In the present embodiment, the common voltages of the strip-shaped main trunk electrodes 110 at different locations are consistent. Generally, the voltage drops of the multiple pixel electrodes 230 closed to the gate driving device 210 are closer so that the common voltages applied on the strip-shaped main trunk electrodes 110 can be the same so that the entire voltage drop of the pixel capacitors formed by a same main trunk electrode tends to consistent. Besides, because the main trunk electrode 110 is a long bar, the manufacturing process is simple and the cost is low. However, the present invention is not limited, in another embodiment of the present invention, a portion of the main trunk electrode is not a long bar. For example, a portion of the main trunk electrode can be multiple independent branch electrodes.

Third Embodiment

Figure 4:
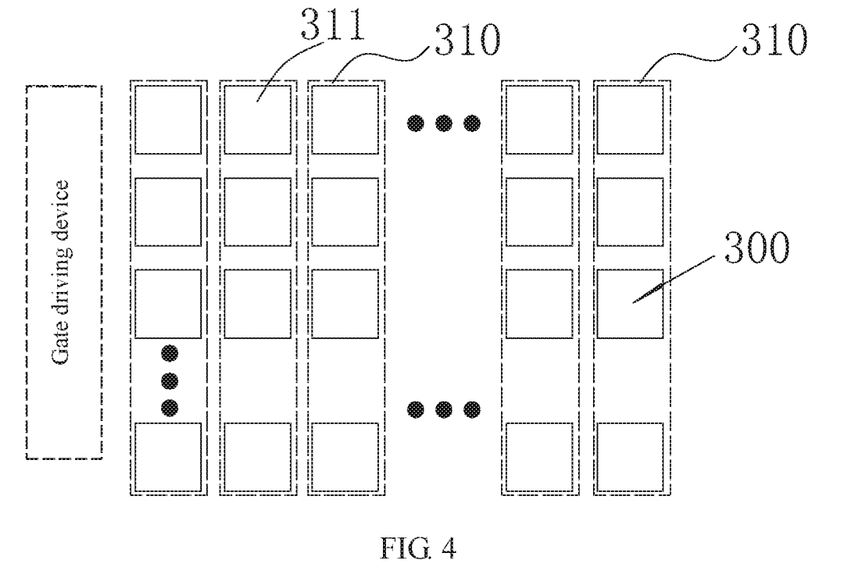
FIG. 4 is a schematic diagram of a common electrode of a third embodiment of the present invention.

FIG. 4 is a schematic diagram of a common electrode of a display panel of a third embodiment of the present invention. The present embodiment is similar to the first embodiment. The main difference between the present embodiment and the first embodiment is the structure of the main trunk electrode.

With reference to FIG. 4, in the present embodiment, each main trunk electrode 310 includes multiple independent branch electrodes 311. Each branch electrodes 311 is square. The multiple branch electrodes 311 of a same main truck electrode 310 are arranged along a column direction. That is, arranged from a top to a bottom. In the present embodiment, the number and shape of the branch electrodes 311 of each main trunk electrode 310 is the same. However, the present invention is not limited. In another embodiment of the present invention, the number and shape of the branch electrodes 311 of each main trunk electrode 310 can be different. Besides, in another embodiment of the present invention, not all of the main trunk electrodes include the branch electrodes. For example, a portion of the main trunk electrodes is a strip-shaped as a long bar.

In the present embodiment, in the row direction from a side closed to the gate driving device to a side away from the gate driving device, in adjacent two main trunk electrodes 310, the common voltage of the previous main trunk electrode 310 is less than or equal to the common voltage of the next main trunk electrode 310. In the present embodiment, because each main trunk electrode 310 includes multiple branch electrodes 311. The common voltages on a main trunk electrode 310 can be an average value of the common voltages of all branch electrodes 311 of the main trunk electrode 310, or the common voltage of one of the branch electrode 311 represents the common voltage of the main trunk electrode 310.

In the present embodiment, the common voltages on the branch electrodes 311 of the same main trunk electrode 310 can be the same or be different. When different, the common voltages on the branch electrodes 311 of the same main trunk electrode 310 generally have little difference.

Fourth Embodiment

Figure 5:
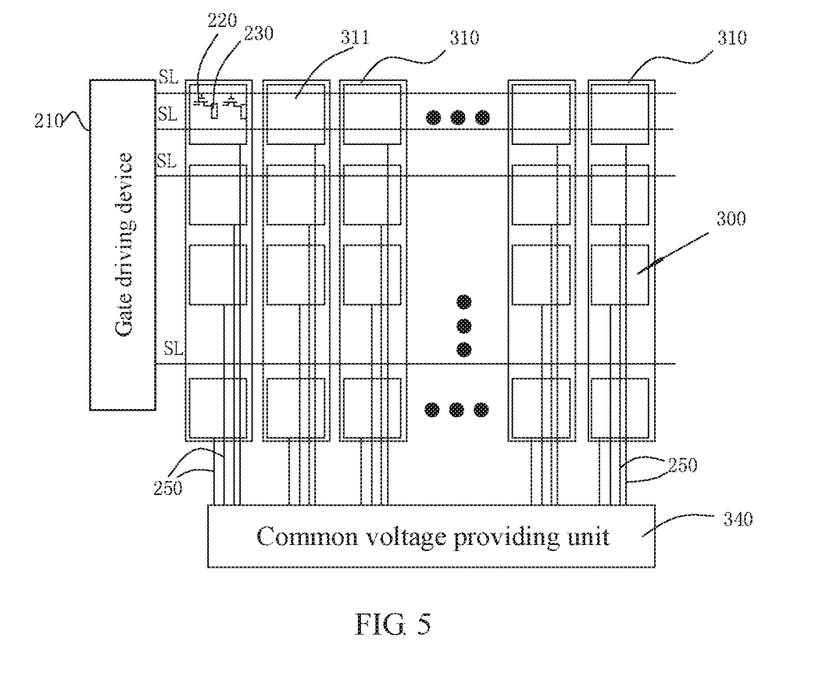
FIG. 5 is a schematic diagram of a display panel of a fourth embodiment of the present invention.

FIG. 5 is a schematic diagram of a fourth embodiment of the present invention. The display panel of the present embodiment includes the common electrode in the third embodiment. The present embodiment is similar to the second embodiment, the main difference between the present embodiment and the second embodiment is the structure of the common electrode.

With reference to FIG. 5, in the present embodiment, the common electrode 300 includes multiple main trunk electrodes 310. The multiple main trunk electrodes 310 are arranged along a row direction, and the multiple main trunk electrodes 310 are independent.

In the present embodiment, each of the multiple main trunk electrodes 310 includes multiple independent branch electrodes 311. The independent branch electrodes 311 are connected to the common voltage providing unit 340 through lead wires 250. The branch electrode 311 is rectangular such as a square shape or a rectangular shape. The multiple independent branch electrodes 311 of a same main trunk electrode 310 are sequentially arranged along the column direction. That is, arranged from a top to a bottom. In the present embodiment, the number and shape of the branch electrodes 311 of each main trunk electrode 310 is the same. However, the present invention is not limited. In another embodiment of the present invention, the number and shape of the branch electrodes 311 of each main trunk electrode 310 can be different. Besides, in another embodiment of the present invention, not all of the main trunk electrodes include the branch electrodes. For example, a portion of the main trunk electrodes is a strip-shaped as a long bar. In the present embodiment, each branch electrode 311 is located above the pixel electrode 230, each branch electrode 311 at least covers one pixel electrode 230. That is, each branch electrode 311 and at least one pixel electrode 230 form one pixel capacitor. Of course, multiple pixel capacitors can also be formed.

In the present embodiment, in the row direction from a side closed to the gate driving device 210 to a side away from the gate driving device 210, in adjacent two main trunk electrodes 310, the common voltage of the previous main trunk electrode 310 is less than or equal to the common voltage of the next main trunk electrode 310. In the present embodiment, because each main trunk electrode 310 includes multiple branch electrodes 311. The common voltages on a main trunk electrode 310 can be an average value of the common voltages of all branch electrodes 311 of the main trunk electrode 310, or the common voltage of one of the branch electrode 311 represents the common voltage of the main trunk electrode 310.

In order to decrease the cost, in the present embodiment, the common electrode 300 can also be used a touch electrode. Specifically, the common electrode 300 functions as one electrode of the pixel capacitor and a touch electrode in a time-division manner. When using as one electrode of the pixel capacitor, the common electrode 300 is applied with the common electrode for a display panel. When using as a touch electrode, the common electrode 300 is applied with a touch signal for detecting if a user touches the display panel and the touch location. In the present embodiment, the common voltage providing unit 340 is a touch chip, and the touch chip sends a common voltage signal and a touch signal to the branch electrodes 311 in a time division manner through lead wires 250. In the present embodiment, the common electrode 300 can be used for a display or be used as a touch electrode. One device has two functions in order to save cost, and decrease the thickness of the display panel. Of course, in another embodiment of the present invention, the touch chip and the common voltage providing unit can also be two devices.

The embodiments in the specification are described in a progressive manner. For same or similar parts in the embodiments, reference may be made to each other. Each embodiment focuses on differences from other embodiments. In particular, the system or system embodiment is basically similar to the method embodiment and therefore is described briefly.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A common electrode of a display panel, wherein the common electrode is located at a side of a gate driving device of the display panel, and the common electrode comprises:
   multiple main trunk electrodes arranged sequentially in a row direction, from a side close to the gate driving device to a side away from the gate driving device, wherein in two adjacent main trunk electrodes of the multiple main trunk electrodes, a common voltage on a previous main trunk electrode is less than or equal to a common voltage on a next main trunk electrode, and a common voltage of a first main trunk electrode of the multiple main trunk electrodes is less than a common voltage on a last main trunk electrode of the multiple main trunk electrodes; and
   wherein at least two main trunk electrodes of the multiple main trunk electrodes comprise multiple independent branch electrodes, which are sequentially arranged in a column direction for each of the at least two main trunk electrodes, and wherein the at least two main trunk electrodes are of different common voltages, and the multiple independent branch electrodes of each of the at least two main trunk electrodes all have different voltages.

2. The common electrode of a display panel according to claim 1, wherein a portion of the multiple main trunk electrodes is strip-shaped, and extended in the column direction.

3. A display panel, comprising:
   a gate driving device;
   multiple scanning lines, wherein a side of the multiple scanning lines are electrically connected to the gate driving device, and the multiple scanning lines are extended in a row direction and are in parallel to each other;
   multiple pixel electrodes electrically connected to corresponding scanning lines through thin-film transistors;
   a common electrode, wherein the common electrode and each of the multiple pixel electrodes form two electrodes of a pixel capacitor, and the common electrode includes multiple main trunk electrodes arranged sequentially in the row direction;
   a common voltage providing unit electrically connected to the multiple main trunk electrodes for providing common voltages to corresponding main trunk electrodes;
   wherein from a side close to the gate driving device to a side away from the gate driving device, in two adjacent main trunk electrodes of the multiple main trunk electrodes, a common voltage on a previous main trunk electrode is less than or equal to a common voltage on a next main trunk electrode, and a common voltage of a first main trunk electrode of the multiple main trunk electrodes is less than a common voltage on a last main trunk electrode of the multiple main trunk electrodes; and
   wherein at least two main trunk electrodes of the multiple main trunk electrodes comprise multiple independent branch electrodes, which are sequentially arranged in a column direction for each of the at least two main trunk electrodes, and wherein the at least two main trunk electrodes are of different common voltages, and the multiple independent branch electrodes of each of the at least two main trunk electrodes all have different voltages.

4. The display panel according to claim 3, wherein a portion of the multiple main trunk electrodes is strip-shaped, and extended in the column direction.

5. The display panel according to claim 3, wherein each of the multiple branch electrodes is connected to the common voltage providing unit through a lead wire.

6. The display panel according to claim 5, wherein each of the main trunk electrodes includes multiple independent branch electrodes.

7. The display panel according to claim 6, wherein the common voltage providing unit is a touch chip, and the touch chip sends a common voltage signal and a touch signal in a time division manner such that when the branch electrode receives the common voltage signal, the branch electrode is used for displaying, when the branch electrode receives the touch signal, the branch electrode is used for detecting if a user touches the display panel.

8. The display panel according to claim 3, wherein each branch electrode covers at least one pixel electrode.

* * * * *